July 25, 1939.　　　　W. W. HAMILL　　　　2,166,931
SHOCK-ABSORBING STEERING WHEEL FOR AUTOMOBILES
Original Filed Oct. 9, 1936
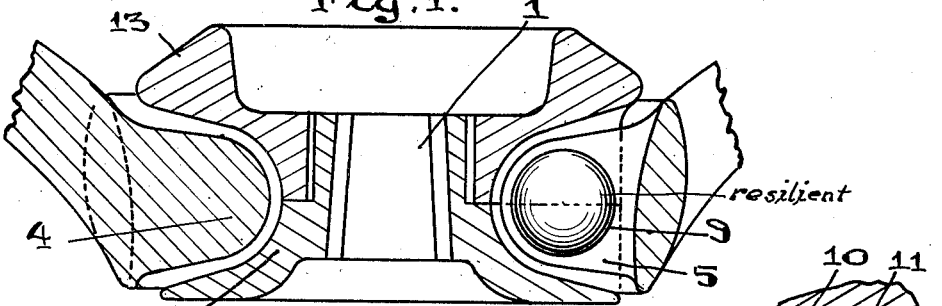
Fig. 1.
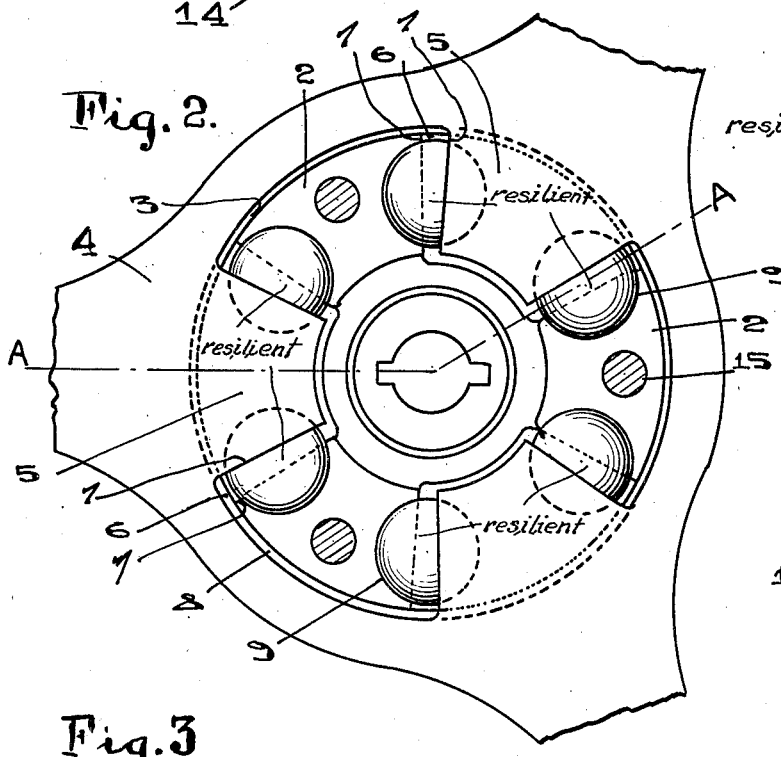
Fig. 2.
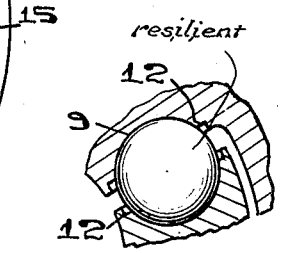
Fig. 5.
Fig. 6.
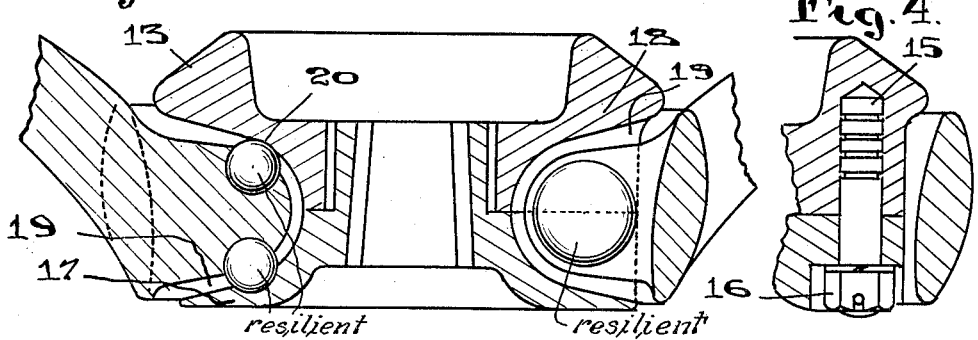
Fig. 3
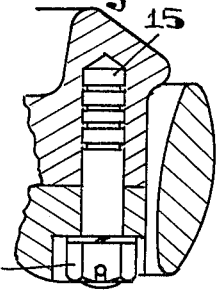
Fig. 4.
William W. Hamill
INVENTOR
by Wm. A. Davis, Attorney.

Patented July 25, 1939

2,166,931

UNITED STATES PATENT OFFICE 2,166,931

SHOCK-ABSORBING STEERING WHEEL FOR AUTOMOBILES

William Wilson Hamill, Chigwell, England

Application October 9, 1936, Serial No. 104,743. Renewed December 24, 1938. In Great Britain October 17, 1935

7 Claims. (Cl. 74—552)

This invention relates to the manually-operated steering wheels of self-propelled vehicles by which the vehicle is guided and controlled, and more particularly to shock-absorbing steering wheels having a steering column member, a steering wheel hub, and rubber or like elements interposed between the said member and the said hub to form a connection therebetween and allow a limited movement between the connected parts.

To transmit the torque between the two members, the rubber or the like is initially compressed, but I have found it advantageous to differentiate between the resistance to movement between the two members in a rotary direction, and flexibility in other directions. Such differentation in the resistances offered to relative movement in different directions, provides or permits of a higher degree of comfort and concurrently a greater feeling of firmness in the sense of steering control of the vehicle.

Accordingly, I propose according to the present invention so to arrange and construct the parts that for transmission of torque the rubber or like elements are subjected to compression, relative rotary motion tending to increase the compression of the rubber elements. For resisting movements in other directions including axial, transverse, or tilting, the shear-resisting strength of the rubber is utilised. The higher resistance of the rubber when subjected to compressive stress beyond the initial compressive stress, provides a firm yet resilient and shock-absorbing connection in a rotary sense, while the higher yield per unit stress of the rubber bodies when in shear provides more flexibility and enhanced comfort in other directions.

A further feature of the invention consists in means for preventing metallic contact of the connected members, comprising supplementary rubber or like bodies preferably arranged in two opposed groups which operate in opposite axial directions, with or without slight pre-compression.

For a fuller understanding of the invention, reference may be had to the accompanying drawing in which:

Figures 1 and 2 illustrate in section and plan a construction of steering wheel according to the invention, the section plane being on line AA of Figure 2.

Figure 3 is a sectional elevation of a modification.

Figure 4 is a fragmentary view showing one method of anchoring bolts which hold together the two sections of the steering column member.

Figures 5 and 6 show fragmentarily modified shapes of cavities in which the rubber elements are housed.

In the construction illustrated in Figures 1 and 2, the periphery of the column member 1 has a number of outwardly-extending radial arms 2 with intervening spaces 3, while the bore of the wheel hub 4 which surrounds the column member has the same number of radial arms 5, which arms extend inwardly into the spaces 3 between the column member arms 2 leaving a small clearance 6 between pairs of adjacent faces 7 for the purpose to be mentioned. Said meshing parts engage in the manner of dogs but with the predetermined angular clearance and also with peripheral clearance 8 sufficient to avoid metallic continuity under normal working relative displacements. In each of the said faces 7 is formed a depression or cavity to house one part of a rubber or like element.

The rubber elements or bodies 9 are of any suitable configuration conveniently spheroidal in the free condition, and the cavities are of a shape corresponding to approximately one half of the body, hemi-spheroidal in the case of rubber balls. When in place, the rubber balls constitute the means of connection between the two connected members, and torque is transmitted from the radial faces of one of the members through the balls to the radial faces of the other member, deformation of the rubber accompanying relative rotary movement of the two members. The normal interspace 6 between the faces of the radial arms provides displacement space into which the rubber can flow when such rotary movement occurs, but such space may be provided for in other ways, as by the incorporation of small sub-cavities 10, Figure 5, in the main cavities 11 which voids 10 are not normally occupied by the rubber. Another method is by counterboring the outer ends of the cavities to leave an annular space 12, Figure 6, encircling each ball. Where the balls fit the cavities as in Figure 2, metallic contact between the faces 7 cannot occur unless the rubber fails, since the rubber zones in the clearance spaces squeeze out into a collar formation around the ball, but with the other arrangements, the faces may contact at about a pre-determined overload torque to transmit the drive positively apart from or independently of the rubber connection. In each embodiment however, failure of the rubber bodies is provided against, since steering control is retained though with some free movement or lost motion.

For convenience in assembly and applying initial compression to the rubber bodies, the column member is made in two sections 13, 14, Figure 1, with the plane of division passing through the middle of the rubber bodies transversely to the wheel axis of rotation the sections being held together by a number of bolts 15 and nuts recessed for flush fitting. Preferably the bolt stems are secured to and depend from the upper section, by casting the metal of the member around them as depicted in Figure 4. The upper part of the upper section 13 is a complete annulus to hide the connection and impart a neat finish to the wheel, Figure 2 showing the wheel with said upper section removed to disclose the lower section 14, each of said sections thus having a series of quadri-cavities. By adjustment of the nuts 16 on the underside of the wheel, Figure 4, the amount of initial compression applied to the rubber bodies and the resultant resistance to relative movement of the connected members, can be varied.

The construction described is not only neat in appearance, being virtually indistinguishable from an ordinary wheel without shock-absorbing provision, but also constitutes a complete unit ready for fitting to the steering column. In the remote possibility of failure of the rubber bodies, steering control is retained.

In the modification illustrated in Figure 3, means to prevent metallic contact of the members when the relative movement is tilting or axial, include supplementary rubber bodies suitably positioned. The lower part of the under section 14 is a complete annulus 17 similar to the annulus 18 of the upper section 13; both annuli are of larger outside diameter than the zone of the torque-transmitting bodies and are spaced from the wheel hub to leave small annular clearance spaces 19. In the upper and lower faces of the heel hub arms 5, are small cavities wherein are seated rubber pads or cushions 20 of ball or cylindrical shape, and the upper face of the annulus 17 may have part spheroidal cavities for the lower row or rubber pads, while the under face of the upper annulus 18 makes surface contact only with the upper row of pads. As with the main rubber bodies, the supplementary ones may be of any convenient shape, spherical, cylindrical, square, or otherwise, the dimensions of the parts being such that the supplementary rubber bodies have no compression or slight compression applied to them when the wheel members are in normal position, so that the lower resistance to tilting, axial or transverse movements than to relative turning movements is maintained.

Not only functionally is the present invention an improvement, but constructionally it may be very simply fabricated. Apart from the rubber bodies and the holding bolts, only three parts are needed, and these parts are simple to make. They may be made in any suitable metal, metals, or synthetic moulded products, conveniently as die or sand cast aluminium alloys which call for a minimum of machining. The amount of relative movement is limited in all directions. Universal movement or movement in three different planes at right angles is provided for, and assembly is extremely easy. When assembling, the main rubber bodies and the supplementary ones when used, are placed in the respective cavities in the wheel member. The two sections of the column member are brought together and clamped by the bolts 15, when the assembly is complete.

Having thus described my invention, what I claim is:

1. Shock-absorbing steering wheel for automobiles comprising a steering column member made in two sections, screw means for holding together said sections, a steering wheel hub member surrounding said column member, arms projecting inwards from the bore of the hub member, arms projecting outwards from the column member and arranged in alternate relation to the arms of the hub member, cavities in the side faces of the wheel hub arms, complementary cavities in the side faces of the column member arms formed partly in one of the sections and partly in the other section of the column member, rubber or like bodies seated in said cavities and subjected to initial compression by said screw means to constitute the connection and allow a limited relative movement between the members.

2. Shock-absorbing steering wheel for automobiles comprising a steering column member having a hub part and a plurality of spaced parts projecting from the hub part, a steering wheel member having a plurality of spaced parts intermediate and in alternate relation to the spaced parts of the column member, clearance being provided between the members to permit relative circumferential and axial movements, cavities in the side faces of the said spaced parts, and a plurality of rubber or like bodies seated in said cavities under initial compression to constitute the connection and transmit torque between the members by compression stress of the rubber bodies and axial movement between the members by shear stress of the rubber bodies.

3. Shock-absorbing steering wheel for automobiles comprising a steering column member having a hub part and a plurality of spaced parts projecting from the hub part, a steering wheel member having a plurality of spaced parts intermediate and in alternate relation to the spaced parts of the column member, clearance being provided between the members to permit relative circumferential and axial movements thereof, cavities in the side faces of the said spaced parts, and a plurality of rubber or like bodies seated in said cavities under initial compression to constitute the connection and allow a limited amount of relative movement between said members.

4. Shock-absorbing steering wheel for automobiles comprising a steering column member having a hub part and a plurality of spaced parts projecting from the hub part, a steering wheel member having a plurality of spaced parts intermediate and in alternate relation to the spaced parts of the column member, clearance being provided between the members to permit relative circumferential and axial movements thereof, cavities in the side faces of the said spaced parts, and a plurality of rubber or like bodies seated in said cavities under initial compression to constitute the connection, allow a limited amount of relative movement between the members, and offer greater resistance to relative rotary movement than to other relative movements of said members.

5. Shock-absorbing steering wheel for automobiles comprising a steering column member having a hub part and a plurality of spaced parts projecting from the hub part, a steering wheel member having a plurality of spaced parts intermediate and in alternate relation to the spaced parts of the column member, cavities in the side faces of the said spaced parts, a plurality of rubber or like bodies seated in said cavities under initial compression to constitute the connection and allow a limited amount of relative movement between said members, and supplementary rubber or like bodies interposed between said members to prevent contact thereof.

6. Shock-absorbing steering wheel for automobiles comprising a steering column member made in two sections, an upper and a lower, screw means for holding together said sections, a steering wheel member surrounding the central part of the column member and intermediate the upper and lower sections thereof, arms projecting inwards from the hub member, arms projecting outwards from the column member and arranged in alternate relation to the arms of the hub member, cavities in the side faces of the wheel hub arms, complementary cavities in the side faces of the column member arms, rubber or like bodies seated in said cavities and subjected to initial compression by said screw means to constitute the connection and allow a limited relative movement between said members, and rubber or like bodies interposed between the said upper section of the column member and the hub member and between the lower section of the column member and the hub member to prevent contact of said members.

7. Shock-absorbing steering wheel for automobiles comprisng a steering column member having a hub part and a plurality of spaced parts projecting from the hub part, a steering wheel member having a plurality of spaced parts intermediate and in alternate relation to the spaced parts of the column member, clearance being provided between the members to permit relative circumferential and axial movements thereof, cavities in the side faces of the said spaced parts, and a plurality of rubber or like bodies seated in said cavities under initial compression to constitute the connection and allow a limited amount of relative movement between said members, said cavities closely fitting and confining the rubber bodies over their whole surface except at the parts lying in the said clearance space between the members.

WILLIAM WILSON HAMILL.